United States Patent [19]
Choi

[11] Patent Number: 6,035,541
[45] Date of Patent: Mar. 14, 2000

[54] METHOD AND APPARATUS FACILITATING THE MEASUREMENT OF A CLEARANCE IN A HEMISPHERICAL DYNAMIC PRESSURE BEARING

[75] Inventor: Jin-Seung Choi, Seoul, Rep. of Korea

[73] Assignee: Samsung Electronics Co., Ltd., Suwon, Rep. of Korea

[21] Appl. No.: 08/977,540

[22] Filed: Nov. 25, 1997

[30] Foreign Application Priority Data

Nov. 26, 1996 [KR] Rep. of Korea .................. 96-42135 U

[51] Int. Cl.[7] ....................................................... G01B 5/14
[52] U.S. Cl. ............................. 33/517; 33/710; 33/712; 33/549
[58] Field of Search ............................. 33/517, 710, 712, 33/832, 833, 549, DIG. 17, 555, 701

[56] References Cited

U.S. PATENT DOCUMENTS

| | | | |
|---|---|---|---|
| 1,062,566 | 5/1913 | Gohlke | 33/517 |
| 5,497,559 | 3/1996 | Okumura et al. | 33/833 |
| 5,557,854 | 9/1996 | Fujioka | 33/549 |

FOREIGN PATENT DOCUMENTS 783561  11/1980  U.S.S.R. .................. 33/517

*Primary Examiner*—Diego Gutierrez
*Assistant Examiner*—Andrew Hirshfeld
*Attorney, Agent, or Firm*—Burns, Doane, Swecker & Mathis, L.L.P.

[57] ABSTRACT

A hemispherical dynamic pressure bearing comprises a bushing in which a hemisphere/shaft unit is mounted with clearance, enabling the unit to move relative to the bushing between first and second terminal positions. In order to measure the size of the clearance, the bearing is inserted into a body, and a retainer disposed in the body is actuated for keeping the bushing stationary. An adjusting mechanism disposed in the body is actuated for displacing the hemisphere/shaft unit vertically relative to the bushing between the first and second terminal positions, wherein the hemisphere/shaft unit projects from an end of the bushing by first and second heights, respectively. Those heights are measured and a difference therebetween is determined, which difference corresponds to the clearance.

3 Claims, 4 Drawing Sheets

METHOD AND APPARATUS FACILITATING THE MEASUREMENT OF A CLEARANCE IN A HEMISPHERICAL DYNAMIC PRESSURE BEARING

BACKGROUND OF THE INVENTION (1) Field of the Invention

The present invention relates to a hemispherical dynamic pressure bearing, and more particularly, to an apparatus for use in a clearance measuring operation for enabling a clearance between a hemisphere and a hemispherical surface of the bearing to be easily measured. The invention also relates to a method of measuring a clearance in a hemispherical dynamic pressure bearing.

(2) Description of Related Art

Generally, a dynamic pressure bearing comprises a supporter, and a rotating member eccentrically and rotatably supported by the supporter. Pressure is formed by a lubricant fluid within a gap defined between the supporter and the rotating member so as to enhance the rotation of the rotating member.

Particularly, a hemispherical type of dynamic bearing is designed such that a portion thereof for supporting the rotating member is hemispherically shaped so as to simultaneously support a radial load and a thrust load.

Referring to FIG. 1, a conventional hemispherical dynamic pressure bearing 9 comprises a supporting shaft 8, and a pair of hemispheres 5 and 6 respectively fixed to upper and lower ends of the supporting shaft 8.

A sleeve 7 is disposed around the supporting shaft 8 between the hemispheres 5 and 6.

A hemispherical bushing 1 includes first and second hemispherical grooves 2 and 3 in which the hemispheres 5 and 6 are disposed, respectively, and a communicating hole 4 for communicating the first and second hemispherical grooves 2 and 3 with each other.

Generally, the hemispheres 5 and 6 are formed through a lapping process, and a light interference measuring system is used to measure a spherical accuracy of the hemispheres.

In addition, a micrometer is further used to measure a clearance between the hemisphere and the hemispherical groove. That is, by using the micrometer, the height of the hemisphere and the depth of the hemispherical groove are measured. Therefore, the value of the clearance can be obtained by a difference between the height and depth.

However, the prior art clearance measuring method as in the above has a drawback in that the measuring process is complicated, resulting in a time-consuming process and an increase in overall manufacturing costs.

SUMMARY OF THE INVENTION

The present invention has been made in an effort to solve the above problems.

It is an object of the present invention to provide methods and apparatus for enabling a clearance between a hemisphere and a surface of a hemispherical groove to be easily measured.

To achieve the above object, one aspect of the present invention relates to an apparatus adapted to facilitate measurement of a clearance in a hemispherical dynamic pressure bearing. The bearing comprises a hemispherical bushing having first and second hemispherical surfaces forming first and second hemispherical grooves, respectively. A hemisphere/shaft unit is mounted in the bushing and comprises a shaft extending through the bushing, and first and second hemispheres mounted on the shaft and disposed with clearance in the first and second grooves, respectively. The unit is movable relative to the bushing in a direction corresponding to an axis of the shaft. The apparatus comprises a body adapted to receive a hemispherical dynamic pressure bearing, a retainer disposed in the body for engaging and keeping stationary a bushing of the bearing while enabling the hemisphere/shaft unit thereof to move, and an adjusting mechanism disposed in the body. The adjusting mechanism includes an adjustment member engageable with the hemisphere/shaft unit for producing up and down movement of the hemisphere/shaft unit relative to the bushing between first and second terminal positions, wherein the hemisphere/shaft unit projects from an end of the bushing by first and second heights, respectively, a difference therebetween representing a magnitude of the clearance.

The invention also relates to a method of measuring a clearance in a such a hemispherical dynamic pressure bearing. The method comprises the steps of inserting the bearing into a body, actuating a retainer disposed in the body for keeping stationary a bushing of the bearing, and actuating an adjusting mechanism disposed in the body for displacing the hemisphere/shaft unit vertically relative to the bushing between first and second terminal positions, wherein the hemisphere/shaft unit projects from an end of the bushing by first and second heights, respectively. The first and second heights are measured and a difference therebetween is taken to determine the clearance.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT OF THE INVENTION

A preferred embodiment of the present invention will now be described in detail with reference to the accompanying drawings.

Figure 1:
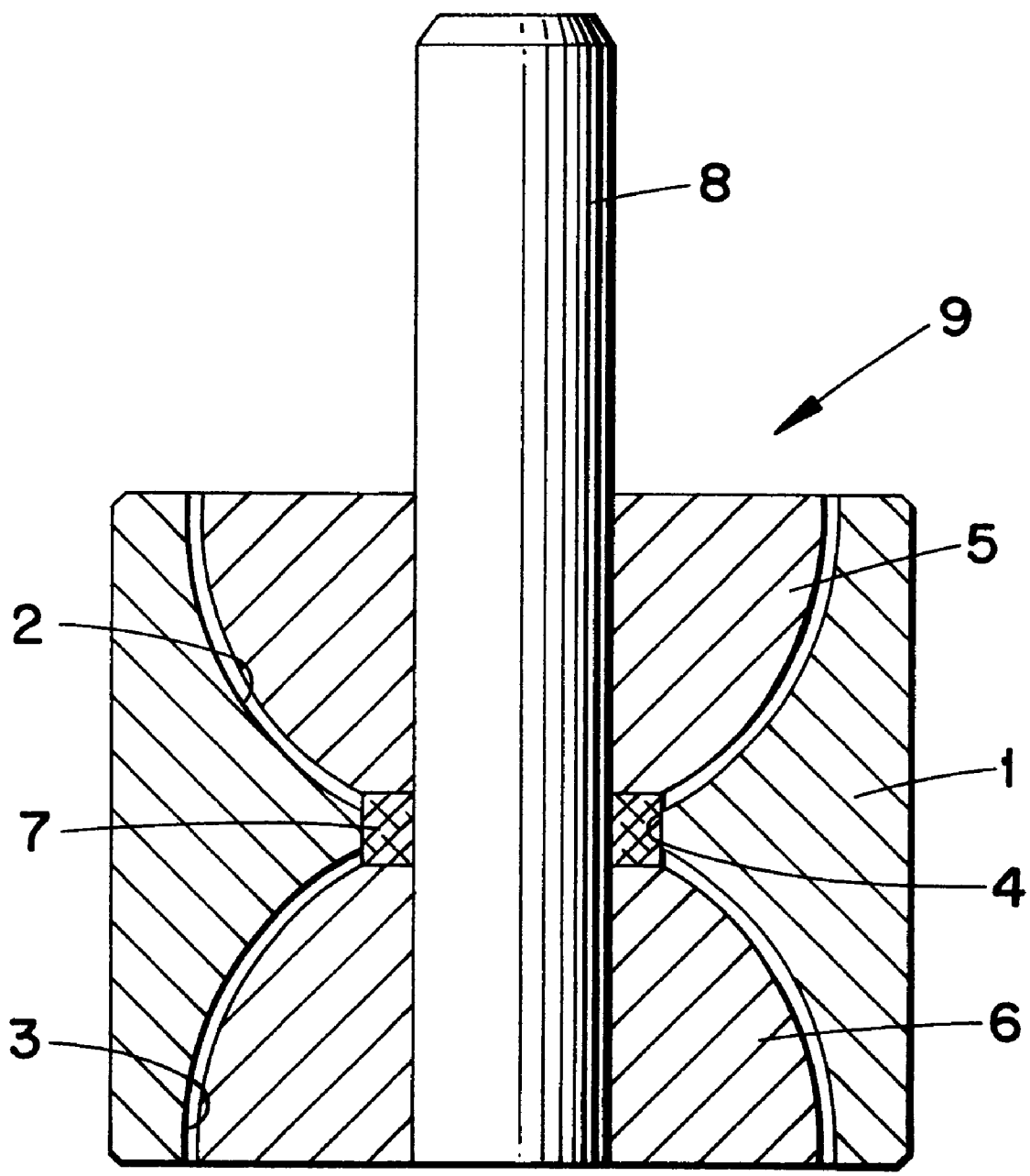
FIG. 1 is a sectional view of a conventional hemispherical dynamic pressure bearing.
Figure 2:
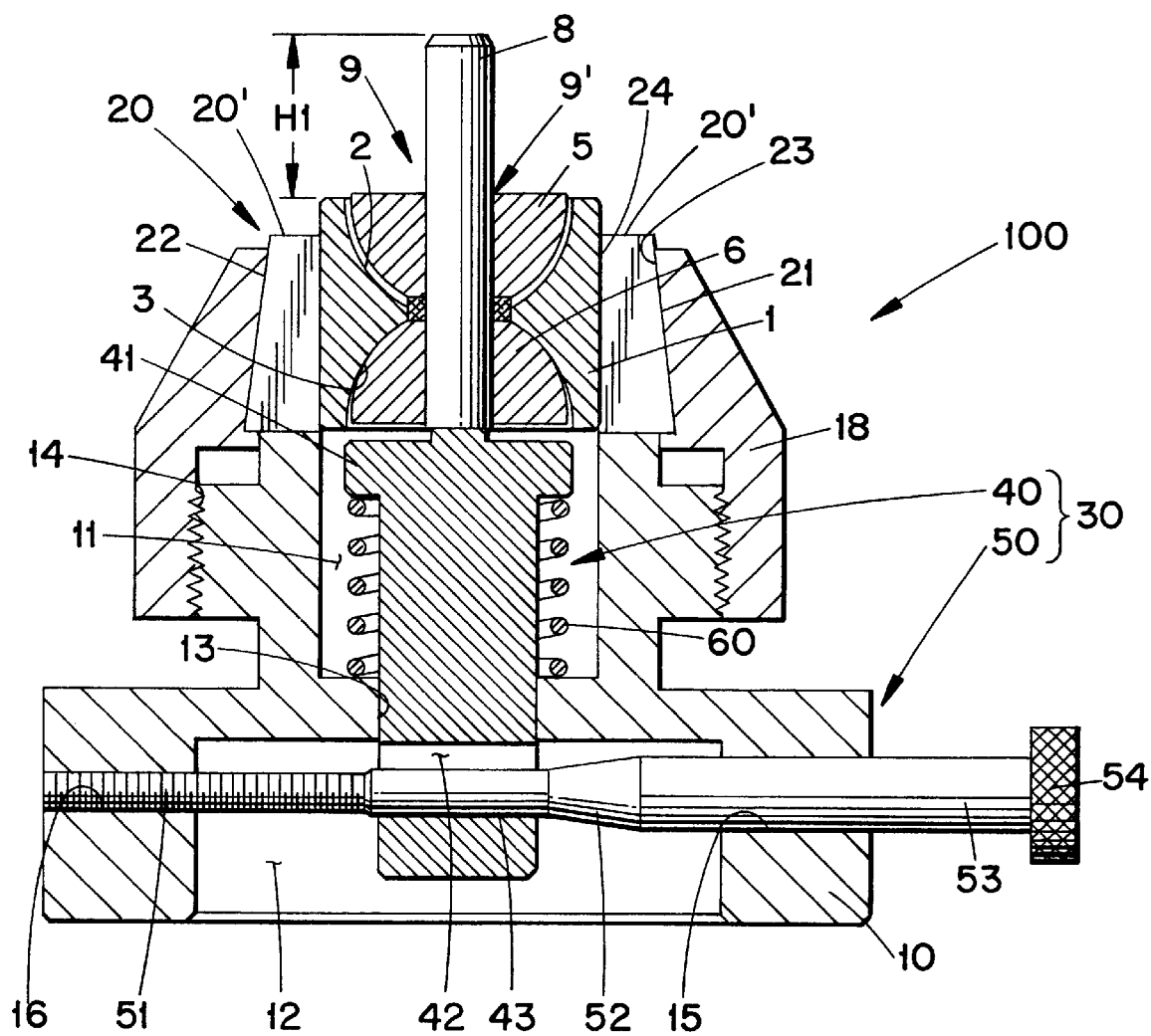
FIG. 2 is a sectional view taken along line 2—2 in FIG. 3 of an apparatus according to a preferred embodiment of the present invention, in which a hemispherical dynamic pressure bearing is disposed in a first state.

Referring to FIG. 2, there is shown a sectional view of a holder 100 according to a preferred embodiment of the present invention, in which a conventional hemispherical dynamic pressure bearing 9 is mounted. The bearing includes a bushing 1 and a hemisphere/shaft unit 9' mounted therein, the latter comprising a shaft 8 to which two hemispheres 5, 6 are fixed.

As shown in FIG. 2, the bushing 1 has two hemispherical surfaces forming hemispherical grooves 2 and 3 on upper and lower ends thereof, respectively. The bushing 1 is inserted into a space formed by four jaws 20' of a chuck 20 of the holder 100. The chuck 20 defines a bushing retainer and is disposed inside a body 10 of the holder 100. The bushing 1 is fixed in place by depressing the pieces of the collet 20 radially inwardly using a fixing member or screw-down collar 18.

An adjusting member 30 mounted on a lower side of the body 10 moves the unit 9' upward and downward.

Describing more in detail, the body 10 is provided with upper and lower cavities 11 and 12 and an adjusting hole 13 communicating the upper and lower cavities 11 and 12 with each other.

Each of the jaws of the chuck 20 is designed to have an inclined outer surface 21, an outer diameter of which is increased as it goes downward. The fixing member 18, having a conical inner surface 22 corresponding to conical outer surfaces 23 of the chuck jaws 20', is snugly inserted around the chuck jaws. The fixing member 18 is screwed to a screw portion 14 formed on an outer circumference of the body 10. Therefore, as the fixing member 18 moves downward as it is screwed to the screw portion 14, the chuck jaws are depressed radially inwardly toward a central axis thereof, thereby clamping the bushing 1.

Figure 3:
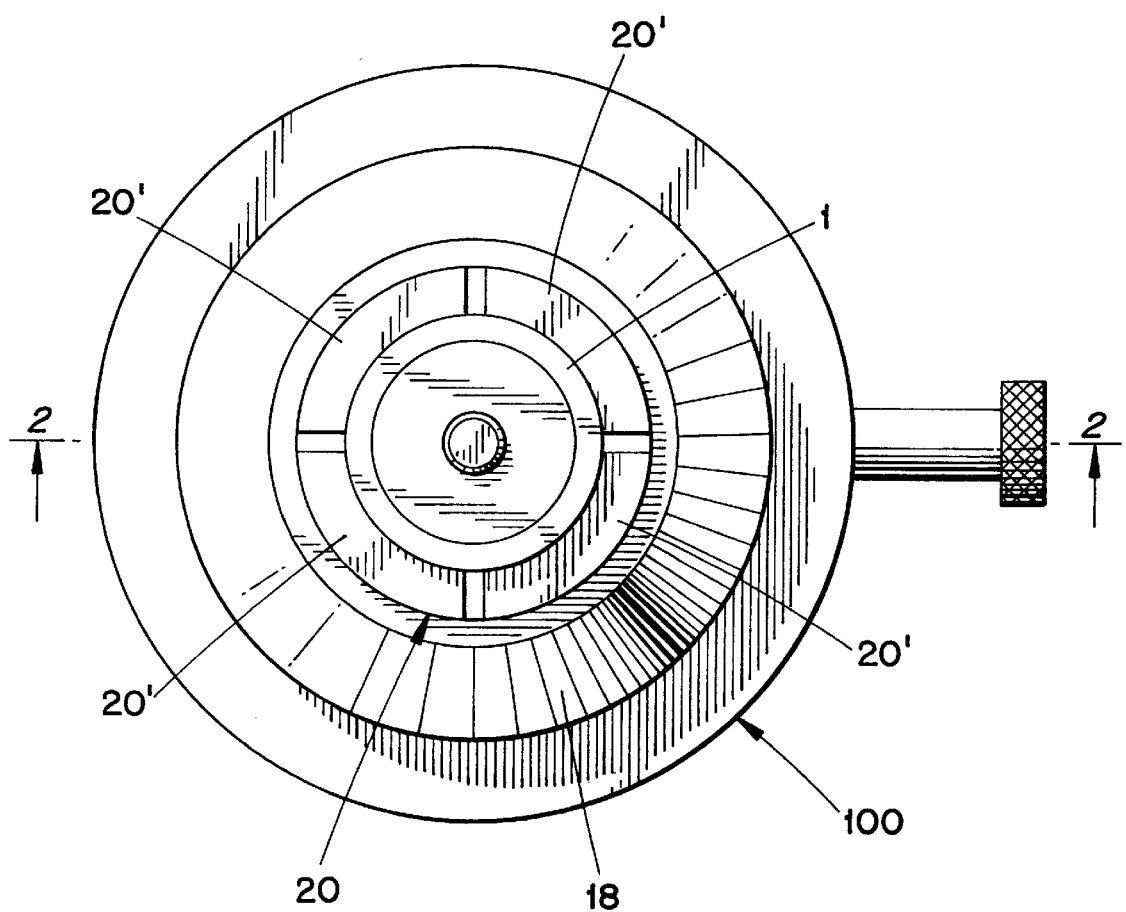
FIG. 3 is a top plan view of the apparatus.

FIG. 3 is a plan view showing the chuck 20. The chuck 20 is disposed around the bushing 1, and the fixing member 18 is disposed around the chuck 20.

Referring again to FIG. 2, the lower cavity 12 is opened at its lower end, and the body 10 is further provided with slide holes 15 and screw holes 16 communicating with the lower cavity 12 in the radial direction. The holes 15 and 16 are formed on a common axis. Inserted into the holes 15 and 16 to extend across the lower cavity 12 is a taper shaft 50.

Inserted into the adjusting hole 13 is an adjusting shaft 40 which constitutes adjusting means for the taper shaft 50. That is, the adjusting shaft 40 moves upward and downward in accordance with a sliding operation of the taper shaft 50.

The adjusting shaft 40 is inserted into the adjusting hole 13 such that its lower and upper ends are located in the lower and upper cavities 12 and 11, respectively. The adjusting shaft 40 includes a plate portion 41 which pushes the coupling shaft 8 upwardly as the adjusting shaft 40 moves upward, and a hole 42 formed at a lower portion of the shaft 40, the hole 42 extending in the radial direction. The axis of the holes 15 and 16 pass through the hole 42.

The taper shaft 50 includes a screw shaft portion 51 screwed in the screw hole 16 after passing through the hole 42 of the adjusting shaft 40, a taper portion 52 extending from the screw shaft portion 51, and a sliding portion 53 extending from the taper portion 52 and located in the slide hole 15. The sliding portion 53 extends out of the slide hole 15. A knurled knob 54 is formed on a front end of the extended sliding portion 53.

Disposed between the bottom of the upper cavity 11 and the plate portion 41 of the adjusting shaft 40 is a spring 60 biasing the adjusting shaft upward.

The operation of the above described apparatus will be described hereinafter.

First, if the knob 54 is rotated in one direction such that the taper portion 52 is moved out of the elevating hole 42, the adjusting shaft 40 is able to be displaced upward by the spring 60 to its uppermost position.

In this state, when inserting the hemispherical bearing 9 into the chuck 20, the coupling shaft 8 is supported by the plate portion 41, and the bushing 1 is displaced downward by gravitational force until engaging the hemisphere 6. This defines an upper terminal position of the hemisphere/shaft unit wherein the hemisphere 6 contacts the surface of the lower hemispherical groove 3, while the hemisphere 5 is spaced away from the surface of the hemispherical groove 2. At this point, if the collar 18 is screwed-down, the bushing 1 is gripped radially by the chuck 20 and held in place thereby. A first height H1 of the shaft above the bushing 1 is then measured.

Figure 4:
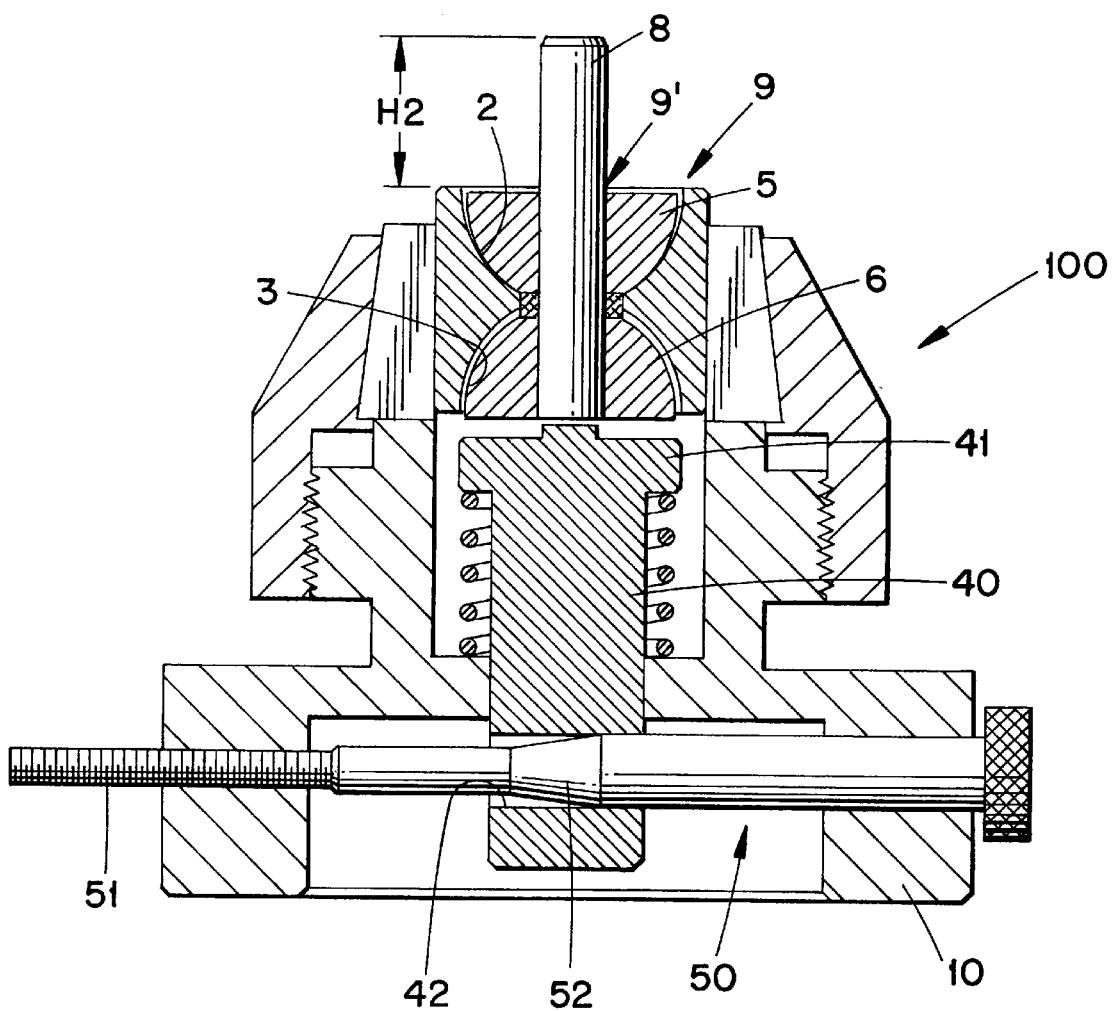
FIG. 4 is a sectional view similar to FIG. 2 showing a second state of the bearing.

FIG. 4 shows the apparatus where the adjusting shaft 40 is moved downward.

As shown in FIG. 4, if the taper shaft 50 is rotated such that the taper portion 52 is inserted into the hole 42, the adjusting shaft 40 is displaced downward as the lower surface 43 of the hole 42 is cammed downward by the surface of the taper portion 52.

As a result, the unit 9' gravitates downwardly and becomes spaced from the plate portion 41. At this point, the hemisphere/shaft unit has traveled to a lower terminal position wherein the hemisphere 5 contacts the surface of the hemispherical groove 2, while the hemisphere 6 is spaced away from the surface of the hemispherical groove 3.

A second height H2 of the coupling shaft 8 is then measured. The second height H2 is subtracted from the first height H1, and the difference represents the total clearance between the hemispheres 5 and 6 and the surfaces of the respective grooves 2 and 3, and half of that total clearance represents the clearance between each hemisphere and its respective groove surface.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. Apparatus adapted to facilitate measurement of a clearance in a hemispherical dynamic pressure bearing comprising a bushing having first and second hemispherical surfaces forming first and second hemispherical grooves, respectively, a hemisphere/shaft unit mounted in the bushing and comprising a shaft extending through the bushing, and first and second hemispheres mounted on the shaft and disposed with clearance in the first and second grooves, respectively, the unit being movable relative to the bushing in a direction along an axis of the shaft, the apparatus comprising:

a body adapted to receive the hemispherical dynamic pressure bearing;

a retainer disposed in the body for engaging and keeping stationary the bushing of the bearing while enabling the hemisphere/shaft unit thereof to move along the axis; and an adjusting mechanism disposed in the body and including an adjusting member engageable with the hemisphere/shaft unit and movable up and down for producing up and down movement of the hemisphere/shaft unit relative to the bushing between first and second terminal positions, wherein the hemisphere/shaft unit projects from an end of the bushing by first and second heights, respectively, a difference between such heights representing a magnitude of the clearance, wherein the adjusting mechanism further comprises an adjusting shaft disposed beneath the adjusting member and mounted for movement in a direction extending transversely relative to an up/down direction of movement of the adjusting member, the adjusting shaft including an inclined camming surface for vertically displacing the adjusting member.

2. The apparatus according to claim 1 wherein the adjusting mechanism further includes a spring biasing the adjusting member upwardly; the camming surface being operable to cam the adjusting member downwardly against a bias of the spring.

3. The apparatus according to claim 1 wherein the retainer comprises a chuck having jaws movable into and out of clamping relationship with the bushing.

* * * * *